June 26, 1945.  D. A. JOHNSTON  2,379,238
BURR REMOVING TOOL
Filed March 2, 1942   2 Sheets-Sheet 1

Inventor
DWIGHT A. JOHNSTON
By Francis J. Klempay
Attorney

June 26, 1945.　　D. A. JOHNSTON　　2,379,238
BURR REMOVING TOOL
Filed March 2, 1942　　2 Sheets-Sheet 2
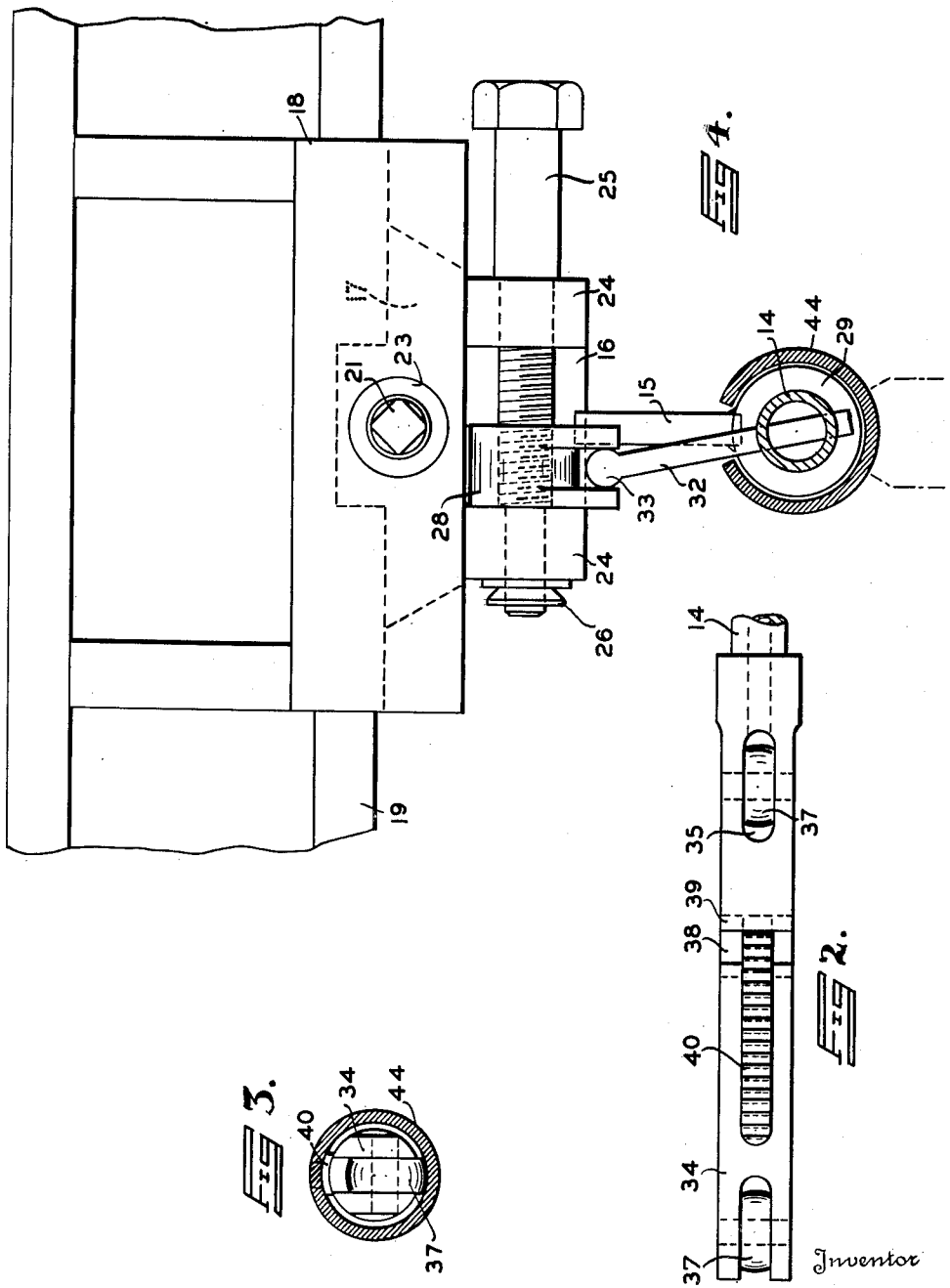
Inventor
DWIGHT A. JOHNSTON
By Francis J. Klempay
Attorney Patented June 26, 1945

2,379,238

UNITED STATES PATENT OFFICE 2,379,238

BURR REMOVING TOOL

Dwight A. Johnston, Youngstown, Ohio, assignor to The McKay Machine Company, Youngstown, Ohio, a corporation of Ohio Application March 2, 1942, Serial No. 433,061

10 Claims. (Cl. 90—33)

This invention relates to the art of manufacturing metal tubes and more particularly to an improved device for removing the burr thrown up in the interior of the tube when the same is manufactured by a process in which the cleft edges of the preformed stock are butt welded together under pressure, which operation results in the formation of the burr as is well understood in the art. The tube making process, being essentially a continuous process, presents substantial difficulties in the removal of the interior burr, particularly in tubes of smaller diameter.

It has been proposed to remove the interior burr in a continuous manner during the manufacture of the tube by employing either interior and exterior rolls to roll down the burr or fixed or movable cutters inside the tube to cut the burr away from the wall of the tube to leave the passage through the tube circular in cross section. In rolling, the excess metal is not removed but merely displaced and consequently the contour and area of the tube passage can not be accurately maintained. Also the excess metal after being flattened is not welded to the body of the tube and after cooling has a tendency to spawl off. In all interior burr removing tools employing cutters of which I am aware, the metal of the continuous burr is shaved off by either a fixed or a rotating cutter in a more or less fixed length and the shaving interferes with the operation of the tool mandrel supporting mechanism employed and is difficult to remove from the interior of the tube, particularly when the tube is of smaller diameter.

It is accordingly the primary object of the invention to provide an interior burr removing tool for a butt weld tube mill in which the excess metal of the burr is removed from the wall of the tube whereby the cross-sectional shape and area of the finished tube may be accurately maintained but in which the metal is removed in such manner that it does not jam the burr removing tool or its supporting mandrel and is readily removable from the interior of the tube. This is accomplished, in accordance with the invention, by employing an adjustable, but normally fixed, broach as the cutting tool to engage and remove the excess metal of the burr. The operation of the broach in this capacity is such that the metal is severed in small and successive increments by the respective teeth of the broach. By employing a substantial number of teeth on the broach, it is possible to decrease the thickness of the individual severed sections to a value sufficient to cause the severed sections to break up into chips or short shavings which readily by-pass the tool supported in the mandrel and pass along with the traveling tube.

Another object of the invention is the provision of an improved arrangement for mounting the interior burr removing tool mandrel in a tube mill. Normal practice is to mount the cutting tool in fixed relation on the mandrel and to fix the mandrel in relation to the seam cleft and seam of the tube being produced. The continuous burr therefore engages the cutting tool at the same point throughout the whole of the production run and, of course, the tool becomes dulled at this point and leaves a longitudinal ridge (or burr) in the tube. To overcome this difficulty, the present invention provides a radius on the cutting edge of the burr removing edge which is substantially coincident with the radius of the passage through the tube being produced, and mounting the tool for ready adjustment about an axis substantially coincident with the longitudinal axis of the tube. Thus wear on the tool may be readily distributed throughout its transverse extent without the necessity of shutting down the mill or removing stock from the same.

The above and other objects and advantages of the invention will become apparent from a consideration of the following detailed specification and the accompanying drawings wherein there is specifically disclosed a preferred embodiment of the invention.

In the drawings:

Figure 2 is a plan view of the tool end of the mandrel of Figure 1;

Figure 3 is an outer end view of the mandrel; and

Figure 4 is a front elevation of the mandrel supporting assembly.

Figure 1:
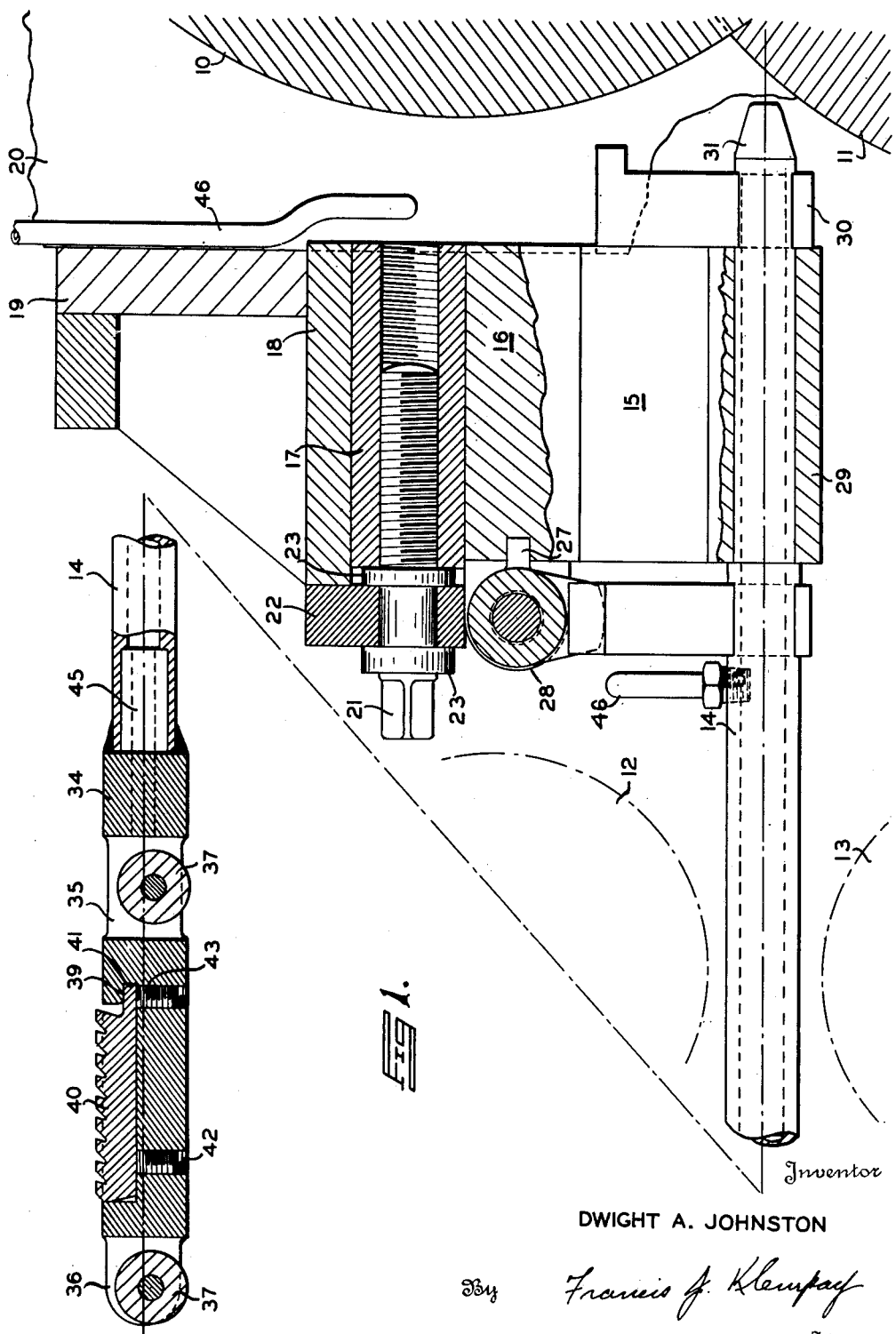
Figure 1 is a broken longitudinal section through a tool and mandrel constructed in accordance with the present invention.

Referring to Figure 1 of the drawings, reference numerals 10 and 11 indicate the upper and lower rolls, respectively, of the next to the last stand of a forming mill which may comprise part of the complete tube mill, and the rolls of the last stand are indicated schematically at 12 and 13. In accordance with usual practice the welding apparatus, not shown, is positioned beyond the rolls 12 and 13 and, of course, the burr removing tool is positioned beyond the welding apparatus.

In accordance with usual practice the mandrel, designated herein by reference numeral 14, supporting the burr removing tool is carried at one end by a plate 15 extending through the open cleft of the stock adjacent the last roll stand of the forming mill. In accordance with the preferred and illustrated embodiment of the present invention, the plate 15 is in turn carried by a block 16 depending downwardly from a slide 17 which is guided for sliding movement in a support 18 which, in turn, is carried by a beam 19 bolted at its ends to the housings 20 of the next to the last forming roll stand.

The longitudinal position of the slide 17 is arranged to be altered by the rotation of a bolt 21 which has screw threaded connection with slide 17 and is held axially fixed with respect to a wall 22 of the member 18 through which it extends by the collars 23.

Block 16 is provided with two laterally spaced forwardly extending lugs 24 through which extends a bolt 25 having threads on that portion thereof which is intermediate the lugs. Bolt 25 is provided with a shoulder to prevent its axial movement in one direction and a retainer 26 prevents its axial movement in the opposite direction. A transversely extending guideway 27 is formed in the block 16 parallel with the threaded portion of the screw 25 and mounted on the threaded portion of the screw and in screw threaded relation therewith is a follower 28 having a lug received within the guideway 27. It should be apparent that rotation of screw 25 will move the follower 28 laterally of the machine.

Welded or otherwise suitably secured to the lower edge of plate 15 is a cylindrical socket 29 in which is rotatably received an end of the mandrel 14, the principal body of which, in the illustrated embodiment, consists of a metal tube. Mandrel 14 may project rearwardly of the socket 29 to be engaged by a peg 30 which prevents outward movement of the mandrel. The rear end of the mandrel is provided with a tapered cap 31 to close off the passage through the tube and to assist the guiding of the stock about the mandrel assembly. Extending diametrically through the mandrel 14 adjacent the front end of the plate 15 and rigidly secured in the mandrel by welding or otherwise is a lever 32 having a rounded outer end 33. Follower 28 has a socket to engage end 33 and it should be obvious that transverse movement of the follower 28 upon rotation of the screw 25 will rotate mandrel 14 about its longitudinal axis.

To the outer end of mandrel tube 14 is secured a tool carrier 34 having supporting roller wells 35 and 36 to receive the supporting rollers 37 which are mounted on transversely extending shafts and which engage the lower portion of the interior surface of the tube wall to support the holder 34 in operative position within the welded tube. As is well understood in the art rollers 37 are backed by rolls engaging the outer surface of the tube.

The upper surface of the holder 34 is provided with a longitudinally extending slot communicating, at its rear end, with a transversely extending slot 38, the side walls of the latter having milled recesses in the bottom plane of the slots. Positioned within the longitudinal slot is a broach 40 having a width substantially equal to the width of the slot and a depth somewhat greater than the depth of the slot so that the cutting teeth of the same project above the upper surface of the holder 34. Broach 40 has a longitudinal projection 41 at its rear wall of the slot 38 as indicated in Figures 1 and 2. Extending vertically below the broach 40 and entirely through the holder 34 are two spaced threaded bores 42 in which are threaded headless setscrews 43. Suitable provision, not shown, may be made to lock the screws in adjusted position and it should be apparent that the screws provide an arrangement whereby the vertical position and the angle of inclination of the broach with respect to the longitudinal axis of the tube may be readily adjusted. As indicated in Figure 3, the teeth of the broach 40 are curved to coincide with the circular curvature of the interior surface of the tube being produced, the tube being designated by reference numeral 44.

Provision is made to conduct lubricant, cooling fluid, or cleaning air to the broach and this means may consist of a bore 45 extending from the rear end of the holder 34 to the roller well 35. Bore 45 is, of course, in communication with the passage through tube 14 and to conduct any of these fluids into the tube, a suitable connection may be made into the tube 14, the fluid being supplied through a conduit 46.

With the parts assembled as indicated in the drawings, the formed stock issues from the roll stand 10, 11 and passes over the holder 29 and mandrel 14 and through the welding throat of the machine where the edges of the stock are butt welded together as is well understood in the art. In this operation a burr is thrown up both exteriorly and interiorly of the tube along the line of weld and as the interior burr is moved against the broach 40, it is removed in incremental sections or depths of cut by the successive teeth of the broach. Broach 40 is so constructed or is so adjusted (by means of set-screws 43) in the holder 34 that proper operation of the broach is attained. The operation of the broach is such that the excess metal of the burr is spawled or cut off in small pieces which readily pass the outer end of the holder 34 and the roller 37 and pass along with the tube away from the burr removing tool.

At intervals during the operation of the mill, the mandrel 14 may be rotated by adjustment of the screw 25 to present new cutting points of the teeth of broach 40 to the burr to distribute the wear transversely of the broach. The necessity for the adjustment is readily determined by an inspection of the completed product. In this manner a greater accuracy may be maintained in the interior shape and area of the tube without the necessity of shutting down the mill. Distributed wear of the teeth of broach 40 may be compensated for by the adjustments 42, 43. The longitudinal adjustment 21 may be employed to center the rollers 37 with respect to the above mentioned backing rolls.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. Burr removing apparatus for a continuous butt weld tube mill comprising a mandrel adapted to be received within the tube at the welding station, means adapted to extend through the open cleft in the tube stock to anchor one end of said mandrel, a burr removing tool carried by said mandrel adjacent the other end thereof, said tool comprising a broach having a multiplicity of cutting teeth arranged to remove the burr in successive increments, said broach being convexed transversely, and means extending through said open cleft to rotate said mandrel about its principal axis and to retain the mandrel in its adjusted position.

2. Burr removing apparatus for a continuous butt weld tube mill comprising a hollow mandrel adapted to be received within the tube at the welding station, means adapted to extend through the open cleft in the tube stock to anchor one end of said mandrel and to conduct fluid under pressure into said mandrel, a burr removing tool carried by said mandrel adjacent the other end thereof, said tool comprising a broach having a multiplicity of cutting teeth arranged to remove the burr in successive increments, said mandrel having means to conduct said fluid pressure to the wall of said tube surrounding said broach.

3. Burr removing apparatus for a continuous longitudinal seam butt weld tube mill comprising a mandrel adapted to be received within the tube at the welding station, means adapted to extend through the open cleft in the tube stock to anchor one end of said mandrel, said means including a swivel connection whereby said mandrel may be rotated about its principal axis, a burr removing tool carried by said mandrel adjacent the other end thereof and being convexed in the direction of the curvature of the tube, and means extending through said open cleft to rotate said mandrel and to retain the same in adjusted position.

4. Apparatus according to claim 3 further including adjustable means mounting said tool on said mandrel whereby a cutting edge of said tool may be moved radially outward of said axis to compensate for general wear across the transverse cutting face of said tool.

5. Burr removing apparatus for a continuous butt weld tube mill comprising a hollow mandrel adapted to be received within the tube at the welding station, means adapted to extend through the open cleft in the tube stock to anchor one end of said mandrel and to conduct fluid under pressure into the same, said means comprising a swivel connection whereby the mandrel may be rotated about its principal axis, a burr removing tool carried by said mandrel adjacent the other end thereof, said tool having a convex cutting edge curved in the direction of curvature of the tube, a passageway in said mandrel to conduct fluid under pressure to the wall of said tube surrounding said tool, and means extending through said open cleft to rotate said mandrel and to retain the same in adjusted position.

6. Interior burr removing apparatus for a continuous longitudinal seam butt weld tube mill comprising a mandrel adapted to be received within the tube at the welding station, means adapted to extend through the open cleft in the tube stock to anchor one end of said mandrel, a holder secured to the other end of said mandrel, a longitudinally extending slot in one face of said holder, a broach positioned in said slot, a tapped bore through said holder at the bottom of said slot, said bore being adapted to receive a set-screw whereby at least a portion of said broach may be raised from the bottom of said slot, said mandrel being hollow whereby fluid under pressure may be conducted into the welded tube about said broach, and means extending through said open cleft to conduct said fluid into said mandrel.

7. Burr removing apparatus for a continuous longitudinal seam butt weld tube mill comprising a mandrel adapted to be received within the tube at the welding station, means adapted to extend through the open cleft in the tube stock to anchor one end of said mandrel, a holder secured to the other end of said mandrel, a longitudinally extending slot in one face of said holder, a longitudinally extending recess in an end wall of said slot, and a broach positioned in said slot, said broach having an integral lug received within said recess.

8. Apparatus according to claim 7 further including a tapped bore in said holder adjacent the other end of said slot and depending from the bottom wall of said slot, said bore adapted to receive a set-screw to engage the underside of said broach adjacent the end thereof opposite said lug.

9. In a continuous longitudinal seam butt weld tube mill, means to anchor the forward end of the burr removing tool carrying mandrel, said means comprising a plate adapted to be supported from the frame of the mill and to extend through the open cleft of the tube stock, a longitudinally disposed cylindrical socket carried by the lower edge of said plate and adapted to rotatably receive a portion of the mandrel, means engaging a portion of the mandrel at the forward end of said socket to prevent the withdrawal of said mandrel from said socket, a lever secured to said mandrel adjacent the other end of said plate, and means comprising a screw threaded member to move said lever and thus rotate said mandrel about its principal axis.

10. Apparatus for mounting the burr removing tool carrying mandrel in a continuous tube mill comprising a support and a plate depending therefrom to pass through the open cleft of the tube stock, a socket carried by the lower end of said plate and adapted to rotatably receive a portion of the mandrel, said mandrel having an aperture extending diametrically therethrough, a lever wedged in said aperture, a screw held against axial movement and extending transversely above said mandrel, a follower on said screw, and means interconnecting said follower and lever whereby rotation of said screw will result in rotation of said mandrel about its principal axis.

DWIGHT A. JOHNSTON.